US008824604B2

(12) United States Patent
Kang et al.

(10) Patent No.: US 8,824,604 B2
(45) Date of Patent: Sep. 2, 2014

(54) METHOD AND APPARATUS FOR SYMBOL DECODING USING TREE PRUNING BASED SPHERE SEARCH

(75) Inventors: Insung Kang, San Diego, CA (US); Byonghyo Shim, San Diego, CA (US)

(73) Assignee: QUACLCOMM Incorporated, San Diego, CA (US)

( * ) Notice: Subject to any disclaimer, the term of this patent is extended or adjusted under 35 U.S.C. 154(b) by 485 days.

(21) Appl. No.: 12/640,515

(22) Filed: Dec. 17, 2009

(65) Prior Publication Data

US 2010/0329395 A1    Dec. 30, 2010

Related U.S. Application Data

(60) Provisional application No. 61/141,358, filed on Dec. 30, 2008.

(51) Int. Cl.
| | |
|---|---|
| *H04L 27/06* | (2006.01) |
| *H04L 25/03* | (2006.01) |
| *H04L 1/00* | (2006.01) |
| *H04L 1/06* | (2006.01) |

(52) U.S. Cl.
CPC ........ *H04L 1/0052* (2013.01); *H04L 25/03197* (2013.01); *H04L 1/0054* (2013.01); *H04L 25/03242* (2013.01); *H04L 1/06* (2013.01)
USPC ............................ 375/341; 375/267; 375/340

(58) Field of Classification Search
CPC ................... H04L 25/03242; H04L 25/03197; H04L 1/0045; H04L 1/0052; H04L 1/0054
USPC .......... 375/316, 340, 341, 267; 714/746, 786, 714/794
See application file for complete search history.

(56) References Cited

U.S. PATENT DOCUMENTS 7,428,269 B2    9/2008 Sampath et al.

OTHER PUBLICATIONS

Byonghyo Shim et al: "On radius control of tree-pruned sphere decoding" Acoustics, Speech and Signal Processing, 2009. ICASSP 2009. IEEE International Conference on, IEEE, Piscataway, NJ, USA, Apr. 19, 2009, pp. 2469-2472, XP031459768 ISBN: 978-1-4244-2353-8 the whole document.
International Search Report and Written Opinion—PCT/US2009/068835, International Search Authority—European Patent Office—Nov. 26, 2010.
Jianping Zheng et al: "Combining Sphere Decoding with M-Algorithm", Information Theory Workshop, IEEE, IEEE, Piscataway, NJ, US, Oct. 1, 2006, pp. 175-178, XP031055518, ISBN: 978-1-4244-0067-6 p. 175, left-hand column, paragraph I-p. 176, right-hand column, paragraph II.

(Continued)

*Primary Examiner* — Betsy Deppe
(74) *Attorney, Agent, or Firm* — Stanton Braden

(57) ABSTRACT

An apparatus and method for symbol decoding by selecting a degree of freedom (DOF) parameter for a noise vector; selecting a delta probability value; computing a cost function for a lattice point that is one of a discrete set of nominal codeword positions in a hypersphere; selecting a sphere decoding radius based on the DOF parameter, the delta probability value and the cost function; and decoding a symbol using the sphere decoding radius. And, the apparatus and method of setting pre-defined threshold probabilities; computing threshold radii based on the pre-defined threshold probabilities; setting an initial sphere radius square to the value of a first threshold radii; finding the Lattice point based on the initial sphere radius square; computing an updated sphere radius square as the minimum of either a cost function or a second threshold radii; and finding a next lattice point based on the updated sphere radius square.

14 Claims, 12 Drawing Sheets

(56) References Cited

OTHER PUBLICATIONS

Partial International Search Report—PCT/US2009/068835, Partial International Search Authority—European Patent Office—Jul. 27, 2010.
Yi Hsuan Wu et al., "Early-Pruned K-Best Sphere Decoding Algorithm Based on Radius Constraints, ISBN: 978-1-4244-2075-9 p. 4496, left-hand column, paragraph Abstract-p. 4498, right-hand column, paragraph I I I .C, XP031266164, IEEE, Piscataway, NJ, USA," Communications, IEEE International Conference, 2008, 4496-4500.
Yuanliang Huang et al., "A new layered space-time-frequency architecture with LDPC coding for OFDM MIMO multiplexing, IEEE Las Vegas, IEEE, Piscataway, NJ, USA LNKDDOI: 10.1109/WCNC. 2006.1683578, XP031102193 ISBN: 978-1-4244-0269-4 p. 835, right-hand column, paragraph I I .B-p. 836, right-hand column, paragraph I I I .A," Wireless Communications and Networking Conference, 2006, 833-838.
Hassibi, B.; Vikalo, H., "On the sphere-decoding algorithm I. Expected complexity," Signal Processing, IEEE Transactions on , vol. 53, No. 8, pp. 2806-2818, Aug. 2005.
Gowaikar, R.; Hassibi, B., "Statistical Pruning for Near-Maximum Likelihood Decoding," Signal Processing, IEEE Transactions on , vol. 55, No. 6, pp. 2661-2675, Jun. 2007.
Wanlun Zhao; Giannakis, G.B., "Sphere decoding algorithms with improved radius search," Communications, IEEE Transactions on , vol. 53, No. 7, pp. 1104-1109, Jul. 2005.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Taiwan Search Report—TW098145367—TIPO—Jun. 24, 2013.

METHOD AND APPARATUS FOR SYMBOL DECODING USING TREE PRUNING BASED SPHERE SEARCH

CLAIM OF PRIORITY UNDER 35 U.S.C. §119

The present Application for Patent claims priority to Provisional Application No. 61/141,358 entitled "Method and Apparatus for Improvements in Tree Pruning Based Sphere Search for Symbol Detection" filed Dec. 30, 2008, and assigned to the assignee hereof and hereby expressly incorporated by reference herein.

FIELD

This disclosure relates generally to apparatus and methods for symbol decoding. More particularly, the disclosure relates to symbol decoding using tree pruning based sphere search.

BACKGROUND

Wireless communications systems provide communication access links for a variety of mobile and fixed users. In general, a wireless communication system is connected to a variety of communication networks such as the Public Switched Telephony Network (PSTN), the Internet, etc. In this manner, mobile users may travel throughout a large geographical coverage area while maintaining connectivity with existing telecommunications networks.

In a wireless communications system, received signals are typically attenuated and distorted versions of the transmitted signals. Furthermore, additive noise degrades the reception of the received signals and may cause errors. Therefore, to provide satisfactory communications service, receivers may need to incorporate error control mechanisms such as error detection with retransmission, error correction, interleaving, etc.

SUMMARY

Disclosed is an apparatus and method for symbol decoding using tree pruning based sphere search. According to one aspect, a method for symbol decoding using tree pruning based sphere search comprising selecting a degree of freedom (DOF) parameter for a noise vector; selecting a delta probability value; computing a cost function for a lattice point wherein the lattice point is one of a discrete set of nominal codeword positions in a hypersphere; selecting a sphere decoding radius based on the degree of freedom parameter, the delta probability value and the cost function; and decoding a symbol using the sphere decoding radius.

According to another aspect, a method for symbol decoding using tree pruning based sphere search comprising setting a plurality of pre-defined threshold probabilities; computing a plurality of threshold radii based on the plurality of pre-defined threshold probabilities; setting an initial sphere radius square to the value of a first of the plurality of threshold radii; finding a Lattice point based on the initial sphere radius square; computing an updated sphere radius square as the minimum of either a cost function or a second of the plurality of threshold radii; and computing an updated lattice point based on the updated sphere radius square.

According to another aspect, an apparatus for symbol decoding using tree pruning based sphere search, the apparatus comprising a processor and a memory, the memory containing program code executable by the processor for performing the following: selecting a degree of freedom (DOF) parameter for a noise vector; selecting a delta probability value; computing a cost function for a lattice point wherein the lattice point is one of a discrete set of nominal codeword positions in a hypersphere; selecting a sphere decoding radius based on the degree of freedom parameter, the delta probability value and the cost function; and decoding a symbol using the sphere decoding radius.

According to another aspect, an apparatus for symbol decoding using tree pruning based sphere search, the apparatus comprising a processor and a memory, the memory containing program code executable by the processor for performing the following: setting a plurality of pre-defined threshold probabilities; computing a plurality of threshold radii based on the plurality of pre-defined threshold probabilities; setting an initial sphere radius square to the value of a first of the plurality of threshold radii; finding a Lattice point based on the initial sphere radius square; computing an updated sphere radius square as the minimum of either a cost function or a second of the plurality of threshold radii; and computing an updated lattice point based on the updated sphere radius square.

According to another aspect, an apparatus for symbol decoding using tree pruning based sphere search comprising means for selecting a degree of freedom (DOF) parameter for a noise vector; means for selecting a delta probability value; means for computing a cost function for a lattice point wherein the lattice point is one of a discrete set of nominal codeword positions in a hypersphere; means for selecting a sphere decoding radius based on the degree of freedom parameter, the delta probability value and the cost function; and means for decoding a symbol using the sphere decoding radius.

According to another aspect, an apparatus for symbol decoding using tree pruning based sphere search comprising means for setting a plurality of pre-defined threshold probabilities; means for computing a plurality of threshold radii based on the plurality of pre-defined threshold probabilities; means for setting an initial sphere radius square to the value of a first of the plurality of threshold radii; means for finding a Lattice point based on the initial sphere radius square; means for computing an updated sphere radius square as the minimum of either a cost function or a second of the plurality of threshold radii; and means for computing an updated lattice point based on the updated sphere radius square.

According to another aspect, a computer-readable medium storing a computer program, wherein execution of the computer program is for: selecting a degree of freedom (DOF) parameter for a noise vector; selecting a delta probability value; computing a cost function for a lattice point wherein the lattice point is one of a discrete set of nominal codeword positions in a hypersphere; selecting a sphere decoding radius based on the degree of freedom parameter, the delta probability value and the cost function; and decoding a symbol using the sphere decoding radius.

According to another aspect, a computer-readable medium storing a computer program, wherein execution of the computer program is for: setting a plurality of pre-defined threshold probabilities; computing a plurality of threshold radii based on the plurality of pre-defined threshold probabilities; setting an initial sphere radius square to the value of a first of the plurality of threshold radii; finding a Lattice point based on the initial sphere radius square; computing an updated sphere radius square as the minimum of either a cost function or a second of the plurality of threshold radii; and computing an updated lattice point based on the updated sphere radius square.

Advantages of the present disclosure include reduces computational complexity and maintains minimal decoder performance degradation with respect to the ideal maximum likelihood (ML) decoder.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
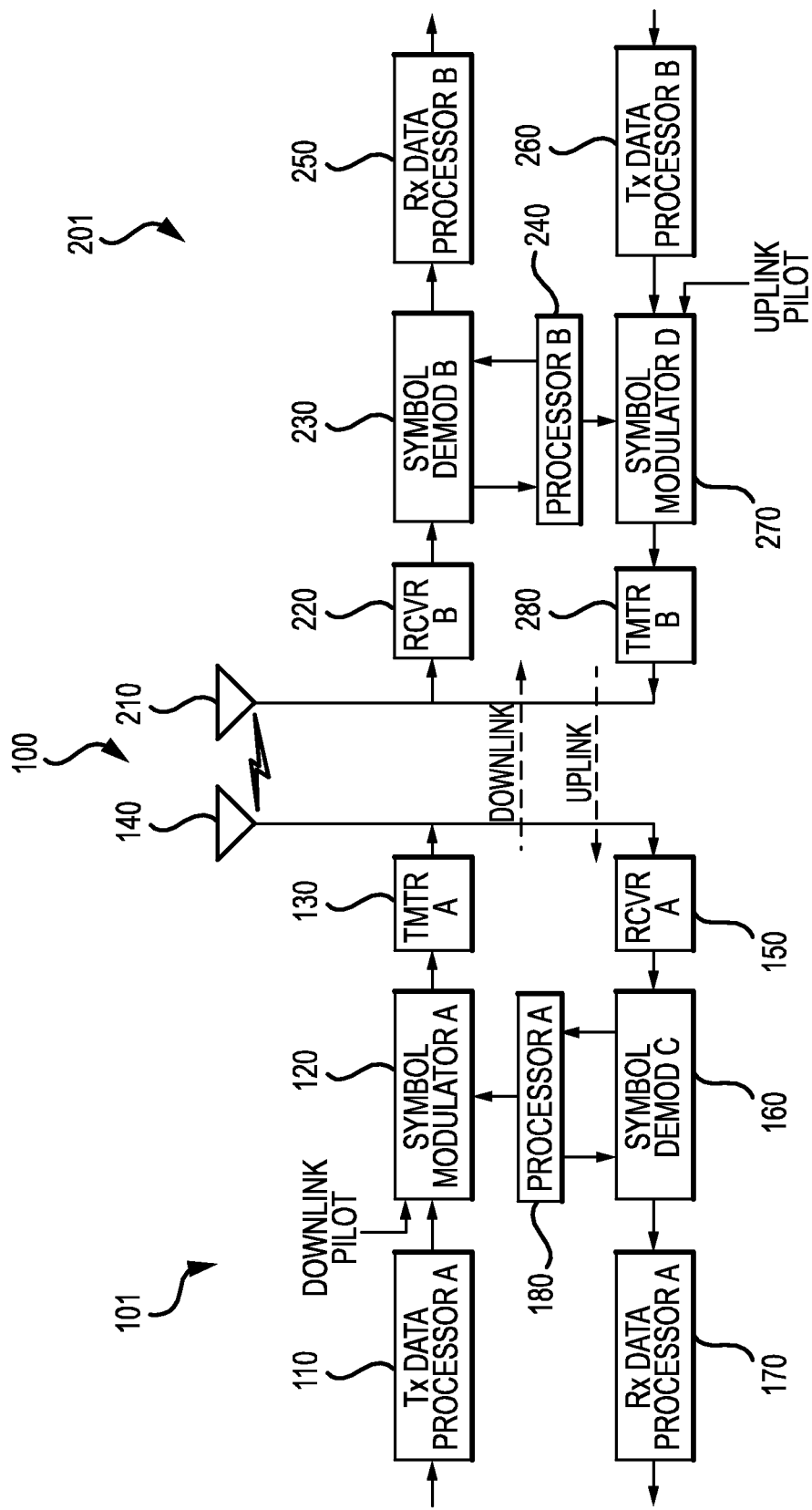
FIG. 1 is a block diagram illustrating an example of an access node/user equipment (UE) system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

FIG. 1 is a block diagram illustrating an example of an access node/user equipment (UE) system 100. In one example, the access node is a base station. One skilled in the art would understand that the example access node/UE system 100 illustrated in FIG. 1 may be implemented in a frequency division multiple access (FDMA) environment, an orthogonal frequency division multiple access (OFDMA) environment, a code division multiple access (CDMA) environment, a wideband code division multiple access (WCDMA) environment, a time division (TDMA) environment, a spatial division multiple access (SDMA) environment, or any other suitable wireless environment.

The access node/UE system 100 includes an access node 101 (e.g., base station) and a user equipment or UE 201 (e.g., wireless communication device or mobile station). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
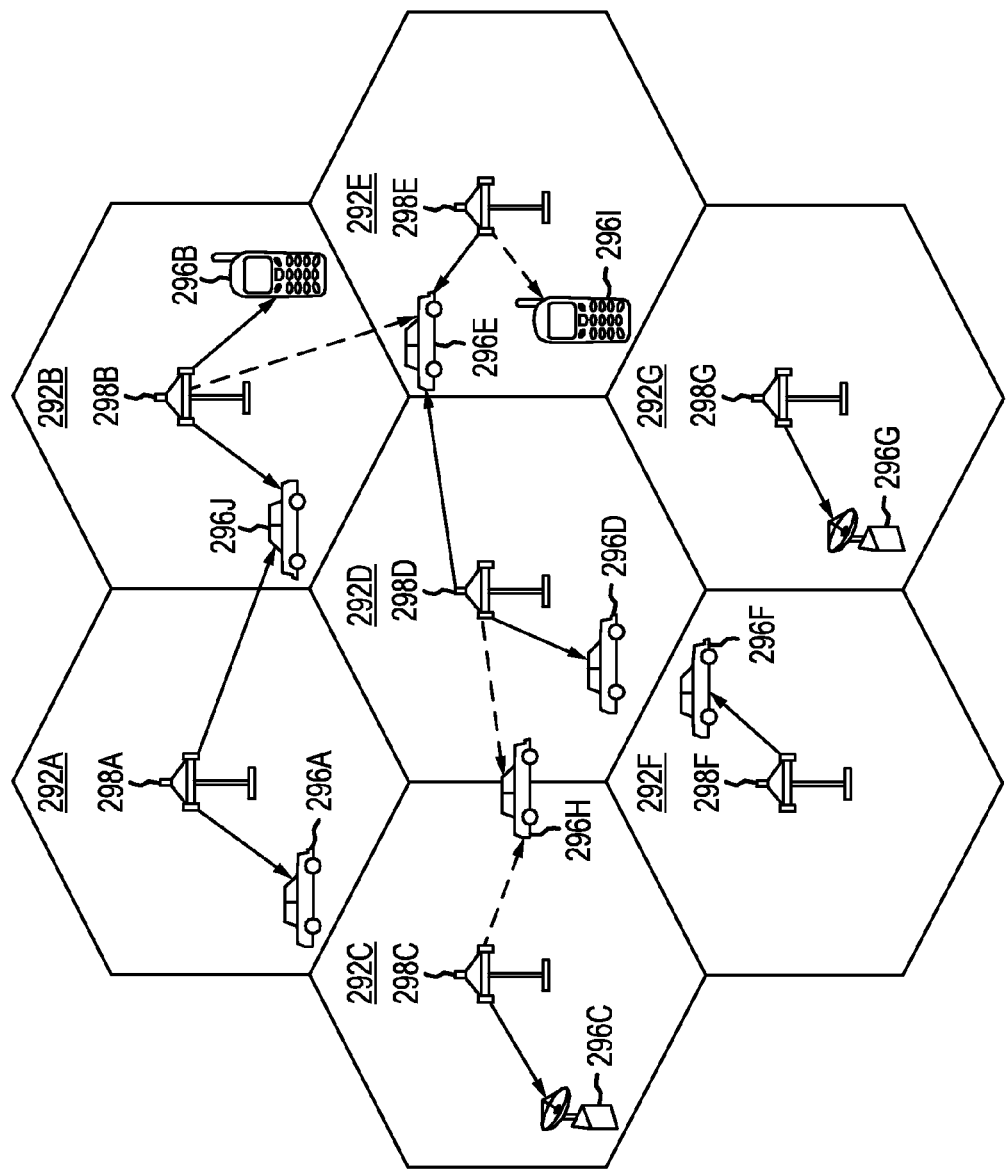
FIG. 2 illustrates an example of a wireless communications system 290 that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In general, a transmitter sends a series of transmitted symbols in transmitted signals and a receiver attempts to recover the transmitted symbols from received signals using symbol detection. In the case of error correction, a variety of coding techniques may be employed such as block codes, convolutional codes, concatenated codes, turbo codes, low density parity check (LDPC) codes, etc. The coding methods generally add structured redundancy to the transmitted signal to allow the receiver to detect and/or to correct errors in the received signal. The various error correction codes may be chosen to balance among various competing metrics such as power efficiency, bandwidth efficiency, implementation complexity, robustness, etc.

In one example, a wireless transmitter accepts a source message, which may be source encoded for data compression, and then channel encodes and modulates it to prepare it for transmission over a wireless channel. Subsequently, a wireless receiver captures the received signal and demodulates and channel decodes it to recover the source message.

A variety of channel decoding methods are widely known in the art. In one example, a maximum likelihood (ML) decoder may be employed to select a codeword y based on a received signal x such that the probability $P(x|y)$ is maximized. That is, y is chosen to maximize the likelihood of y given an observed received signal x. ML detection of the sequence of finite alphabet symbols requires a search for the entire block of symbols. However, the computational complexity of a ML decoder has exponential complexity with respect to signal dimensions such as the number of modulation states, number of transmit antennas, etc. This implementation complexity is a disadvantage for ML decoders if the dimensionality is high, for example, in multiple-input multiple-output (MIMO) communication systems.

As an alternative to ML decoding, sphere decoding (SD) may be used to reduce the decoder complexity. In a sphere decoder, the decoding search space is restricted within a multi-dimensional hypersphere with a radius centered at a received signal vector, which reduces the decoding complexity. A variety of algorithms may be used to implement the sphere decoder such as increase radius search (IRS), improved increasing radius search (IIRS), and increasing radii algorithm (IRA). In general, these algorithms reduce the implementation complexity compared to the basic sphere decoding approach with some performance loss as the tradeoff. However, existing SD algorithms still require significant computational resources to implement.

One example sphere decoding (SD) algorithm is known as probabilistic tree pruning SD (PTP-SD). In this algorithm, tree pruning is expedited by the addition of a probabilistic noise constraint into a path metric, generated by the probabilistic model of the unvisited nodes.

Maximum likelihood (ML) detection of receive waveform symbols requires a search through the entire block of symbols. Although the ML solution is optimal in terms of minimum probability of error, for a general matrix where no exploitable structure is available, ML decoding is known to be NP-hard (i.e., non-deterministic polynomial-time hard). A Sphere Decoding (SD) algorithm has been proposed for symbol detection, which enumerates symbols in a hypersphere with small radius instead of whole lattice points. In one aspect, the decoding problem may be depicted as a search throughout a multi-dimensional abstract space, known as a hypersphere, with a discrete set of nominal codeword positions, known as lattice points.

Although the SD algorithm has received considerable attention due to its computational efficiency in many communication scenarios, in particular for multiple-input multiple-output (MIMO) antenna systems, a considerable computational burden is still required, which limits real-time system applications. The SD algorithm depends on the choice of sphere radius within which the search space is limited. Several approaches have been proposed to provide the efficient control of sphere radius including increase radius search (IRS), improved increasing radius search (IIRS), and increasing radii algorithm (IRA). It has been shown that these algorithms achieve a reduction in complexity over the SD algorithm with negligible performance loss.

A modification to the SD algorithm may be used, known as probabilistic tree pruning SD (PTP-SD), which relaxes the strict ML search to reduce the computational complexity. In one aspect, tree pruning refers to eliminating certain branches of a search tree, based on given criteria. Using a probabilistic noise constraint into the path metric, generated by the probabilistic model of the unvisited nodes, expedites the tree pruning. Since the sphere constraint is loose for most layers of the search tree, the addition of the estimated noise contribution tightens the necessary condition, and therefore facilitates the pruning of the unlikely segments of the tree. The elimination of unvisited subtrees achieves considerable computational savings with negligible performance degradation.

In one aspect, the present disclosure discloses an extension of the PTP-SD algorithm which reduces computational complexity with minimal extra cost. One skilled in the art, in reviewing the present disclosure would know that the present disclosure is not limited to the PTP-SD. A conventional PTP-SD algorithm fortifies the structural weakness of the sphere search by tightening the sphere radius per layer. In contrast, the presently disclosed extended PTP-SD technique focuses on the sphere radius control strategy when a candidate lattice point is found. In this respect, the conventional PTP-SD technique is an intra-search radius control rule and the presently disclosed extended PTP-SD technique is an inter-search radius control (ISRC) rule.

Although sphere decoding dynamically updates the search radius whenever a new candidate is found and hence shrinks the hypersphere volume, it does not necessarily result in a fast ML search. In one example, a fast ML search may not be attained when the lattice points within the hypersphere are densely spaced in their cost function (e.g., a low signal/noise ratio (SNR) scenario). In another example, even when the lattice points within the hypersphere are spaced apart, if the initial sphere radius is set too large and away from the ML point, the number of lattice points examined in sphere decoding would be substantial. Hence, a mechanism providing an aggressive radius control is crucial for achieving further reduction in search space.

Two key requirements are considered in the design of the extended PTP-SD technique. First, ML lattice points are included in the hypersphere with high probability for minimizing the performance loss. Second, two extreme situations (too large or too small sphere radius) are prevented. Having too small a radius is as detrimental as too large a radius since no lattice point exists inside the sphere which results in a search failure.

In order to satisfy these requirements, we employ a hybrid of the dynamic radius update that naturally depends on the lattice point found and the lattice independent radius selection scheme relying only on the noise statistics. As a result, many lattice points are excluded in the search process for sphere decoding, with performance close to the optimum ML decoding technique. Simulations of the extended PTP-SD decoding technique for MIMO channels demonstrate near-ML decoding performance while additionally providing considerable complexity savings over the conventional PTP-SD technique.

SD Algorithm (Conventional)

In one example, ML detection of a real-valued linear system is described by equation (1):

$$r = Hs + v \quad (1)$$

where s is the transmitted symbol vector whose components are elements of a finite set $F$; r is the received signal vector; v is the independent, identically distributed Gaussian noise vector; and H is a channel matrix. If H is given, the ML estimate becomes $$s_{ML} = \arg\min_{s \in F^m} \|r - Hs\|^2 \quad (2)$$

In one aspect, the SD algorithm searches the lattice points inside the hypersphere with radius $\sqrt{r_0}$, instead of searching all lattice points Hs. That is, the lattice points satisfying $\|r-Hs\|^2 < r_0$ are being searched. To make the search systematic, the actual search is performed in the QR-transformed domain given by the cost function J(s) such that:

$$J(s) = \|y - Rs\|^2 \le d_o \quad (3)$$

where $H = [Q\ U][R^T\ O^T]^T$, $y = Q^T r$, and $d_0 = r_0 - \|U^T r\|^2$. Since R is an upper triangular matrix, (3) becomes:

$$\sum_{k=1}^{m} \left( y_k - \sum_{l=k}^{m} r_{k,l} s_l \right)^2 \le d_o \quad (4)$$

Since each term in the left hand side of equation (4) is a function of $s_k, \ldots, s_m$ (henceforth denoted as $s_k^m$), equation (4) can be expressed as:

$$B_1(s_1^m) + B_2(s_2^m) + \ldots + B_m(s_m^m) \le d_0 \quad (5)$$

where $$B_k(s_k^m) = \left( y_k - \sum_{l=k}^{m} r_{k,l} s_l \right)^2$$

is the branch metric at layer m−k+1. In one aspect, the SD algorithm may be explained as a tree search algorithm where the candidate of the first layer (bottom row in the matrix structure) is computed initially by the comparison $B_m(s_m^m) \le d_0$. Once the candidate $s_m$ satisfying this condition is found, we move on to the next layer and $s_{m-1}$ satisfying $B_{m-1}(s_{m-1}^m) + B_m(s_m^m) \le d_0$ is found. By repeating this step and updating the radius whenever a new lattice point Rs is found, the SD algorithm outputs the ML point $s_{ML}$ for which the cost function J(s) is minimized.

Probabilistic Tree Pruning-SD (PTP-SD) Algorithm:

Although, in one aspect, the SD algorithm tests the condition described in equation (5), due to the nature of progressive search, the path metric at layer m−k+1 contains only the contributions of visited layers as:

$$P_k^m(s_k^m) = B_k(s_k^m) + \ldots + B_m(s_m^m) \le d_0 \quad (6)$$

where $P_k^m(s_k^m)$ is the path metric that is an accumulation of branch metrics from layers 1 to m−k+1. A key feature behind the probabilistic tree pruning is to use equation (5) instead of equation (6) throughout all layers in the search. Since the branch metrics $B_1, \ldots B_{k-1}$ are unavailable at layer m−k+1, assuming perfect decoding, they are modeled as Gaussian noise $$B_l(s_l^m) = \left( y_l - \sum_{j=l}^{m} r_{l,j} s_j \right)^2 = v_l^2 \text{ for } l = 1, \ldots, k-1 \quad (7)$$

where $v_l$ is the l-th component of the Gaussian noise vector v. From equation (5) and equation (7), the new necessary condition for decoding search becomes $$\sum_{l=1}^{m} B_l(s_l^m) = P_k^m(s_k^m) + \sum_{l=1}^{k-1} v_l^2 \le d_0 \quad (8)$$

Since $v_1, \ldots v_{k-1}$ are values from an independent, individually distributed Gaussian distribution, $$\sum_{l=1}^{k-1} v_l^2$$

becomes a chi-squared ($\chi^2$) random variable with k−1 degrees of freedom. Denoting $$\Phi_{k-1} = \sum_{l=1}^{k-1} v_l^2,$$

equation (8) becomes $$P_k^m(s_k^m) + \Phi_{k-1} \le d_0 \quad (9)$$

In order to obtain the pruning condition, a concept of pruning probability is introduced. On each node visited, we examine the probability that the rest of the tree is decoded perfectly so that the remaining portion is a pure noise contribution. If the probability of this event is too small and thus less than a pre-specified threshold, we regard this event as an unlikely one and prune the subtree starting from the node. This condition can be described as $$P_r(\Phi_{k-1} \le d_0 - P_k^m(s_k^m)) < P_\epsilon \quad (10)$$

where $P_\epsilon$ is the pre-specified pruning probability. Equation (10) can be rewritten as $F_\Phi(d_0 - P_k^m(s_k^m); k-1) < P_\epsilon$ where $$F_\Phi(\psi; k) = \frac{\gamma\left(\frac{k}{2}, \frac{\psi}{2}\right)}{\Gamma\left(\frac{k}{2}\right)}$$

is the cumulative distribution function of chi-squared random variable with DOF k, where $\Gamma(k)$ and $\gamma(k, x)$ are the Gamma function and incomplete Gamma function, respectively. By taking the inverse, we obtain $$d_o - P_k^m(s_k^m) < F_\Phi^{-1}(P_\epsilon; k-1) \quad (11)$$

Denoting the pruning parameter at layer m−k+1 as $\beta_{k-1} = F^{-1}_\phi(P_\epsilon; k-1)$, equation (11) becomes:

$$P^m_k(s^m_k) < d_o - \beta_{k-1} \quad (12)$$

Figure 3A:
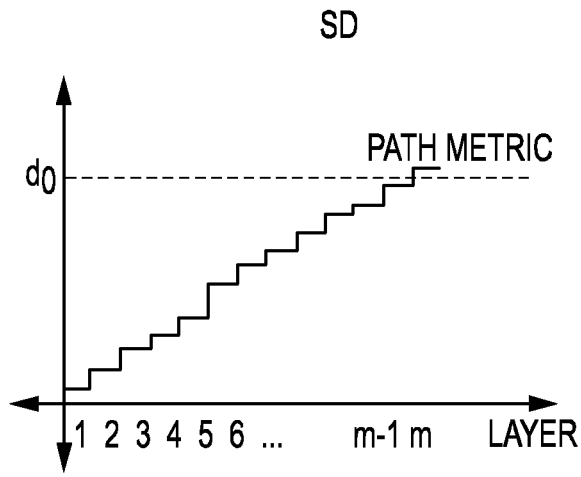
FIGS. 3(a) and 3(b) illustrate examples of sphere decoding (SD) and probabilistic tree pruning-sphere decoding (PTP-SD) searches, respectively.
Figure 3B:
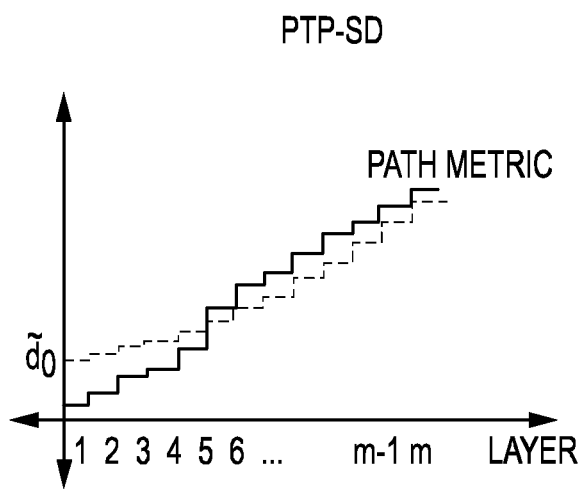

The interpretation of equation (12) is that if the path metric in layer m−k+1 is larger than $d_0-\beta_{k-1}$, the rest of search is unlikely to satisfy the sphere condition even for the best scenario (e.g., the remaining nodes are detected perfectly and their contributions are noises only). Hence, whenever a path $s^m_k$ meets this condition, it is removed from the subtree. The corresponding tightened necessary (i.e., survival) condition is summarized as $$P^m_k(s^m_k) < d_o - \beta_{k-1} \equiv \tilde{d}_o(k) \quad (13)$$

where $\tilde{d}_0(k)$ is the modified sphere radius square at layer m−k+1. FIGS. 3(a) and 3(b) illustrate examples of sphere decoding (SD) and probabilistic tree pruning-sphere decoding (PTP-SD) searches, respectively. The operations of the SD and the PTP-SD searches are illustrated in FIGS. 3(a) and 3(b), respectively.

Although the cost function J(s) of the tested branch is larger than the sphere radius square $d_0$, the pruning of the SD algorithm occurs at the final layer due to the slow increase in the cost function. Whereas, since $P^m_{m-5} > \tilde{d}_0(m-5)$, the pruning of the PTP-SD occurs at the sixth layer. In one example, a conventional PTP-SD technique suggests a significant reduction of complexity of the PTP-SD technique over the SD technique in low and mid signal-to-noise ratio (SNR) regimes (roughly defined as the SNR regions such $P_e(SNR) > 10^{-3}$). However, the benefit of the conventional PTP-SD technique vanishes as the SNR increases so that the complexity of the PTP-SD technique converges asymptotically to the SD technique complexity in the high SNR regime.

High SNR Scenario

Figure 4:
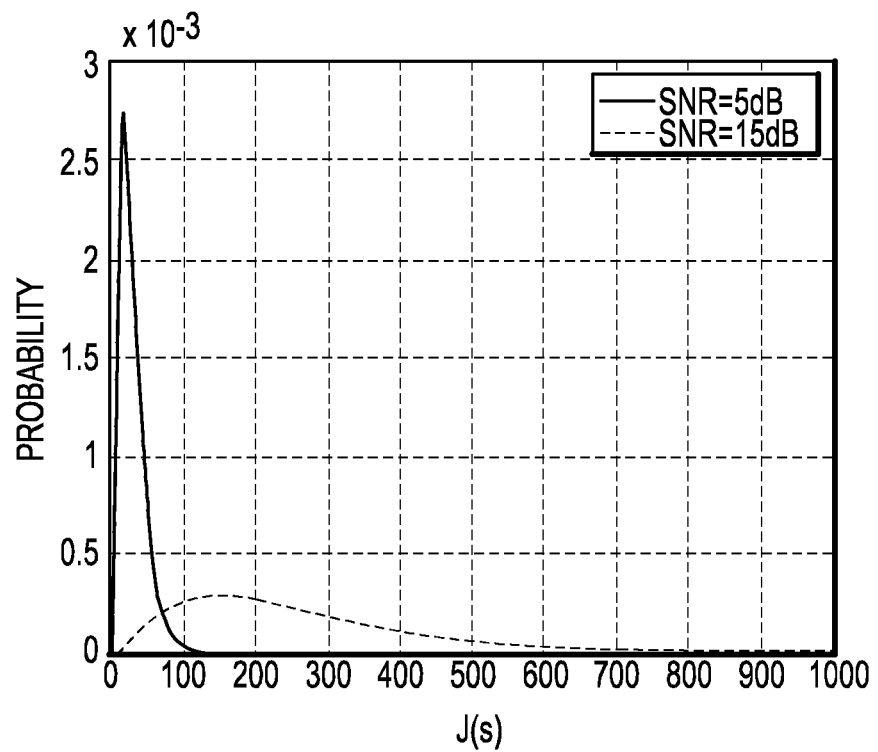
FIG. 4 illustrates an example of a probability mass function (PMF) of a cost function J(s) for a 4×4 MIMO system with 16-QAM in the low and high signal-to-noise ratio (SNR).

FIG. 4 illustrates an example of a probability mass function (PMF) of a cost function J(s) for a 4×4 MIMO system with 16-QAM in the low and high signal-to-noise ratio (SNR). As depicted in FIG. 4, as the SNR increases, the distribution of the cost function J(s) widens. Hence, the difference between the cost function $\Delta(s_i,s_j) = |J(s_i)-J(s_j)|$ for two distinct symbol vectors $s_i$ and $s_j$, becomes larger. For a candidate lattice point $Rs_0$ found by the sphere search, the distance to the closest lattice point $Rs_1$ with cost function smaller than $J(s_0)$ can be expressed as $$\Delta_{min}(s_0) = \min_{\{s_1 | J(s_1) < J(s_0)\}} \Delta(s_0, s_1) \quad (14)$$

In one aspect, the following lemma (Lemma 1) explains the shortcoming of the conventional PTP-SD technique in the high SNR scenario.

Lemma 1: If $\Delta_{min}(s_0) > \max_i \beta_i$, the pruning operation of the conventional PTP-SD technique is equal to that of the SD technique for every $s \in B_{Rs}(y, J(s_0))$ where $B_{Rs}(y, J(s_0)) = \{s | J(s) \leq J(s_0)\}$.

Proof: Since the lattice points in $B_{Rs}(y, J(s_0))$ are not pruned by the SD technique, it suffices to show that these are not pruned by the conventional PTP-SD technique either. The pruning operation of the conventional PTP-SD technique occurs if $P^m_k(s^m_k) > J(s_0) - \beta_k$. Rearranging this relation yields, $$\beta_k > J(s_0) - P^m_k(s^m_k) \quad (15)$$

However, by hypothesis, we have $J(s_0) - J(s) \geq \Delta_{min}(s_0) > \max_i \beta_i \geq \beta_k$ for any s satisfying $J(s) < J(s_0)$. Noting further that $J(s) = P^m_1(s^m_1) \geq P^m_k(s^m_k)$, then $$J(s) - P^m_k(s^m_k) > J(s_0) - J(s) > \beta_k \quad (16)$$

for any $s \in B_{Rs}(y, J(s_0))$ and layer k, which contradicts the pruning condition in equation (15).

Figure 5:
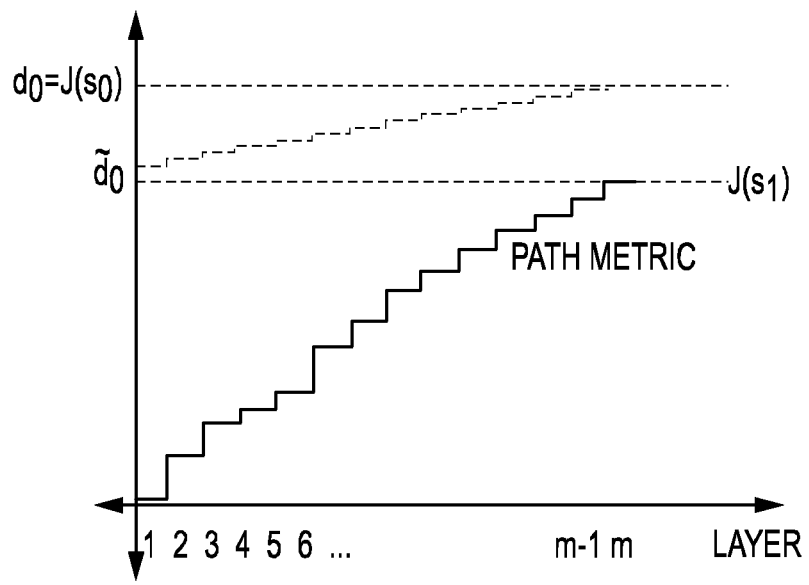
FIG. 5 illustrates an example of a probabilistic tree pruning-sphere decoding (PTP-SD) search in a high SNR scenario.

FIG. 5 illustrates an example of a probabilistic tree pruning-sphere decoding (PTP-SD) search in a high SNR scenario. As illustrated in FIG. 5, if the cost function difference $J(s_0) - J(s_1)$ is larger than $\beta_{max}$, the pruning of the conventional PTP-SD technique is useless for $s_1 \in B_{Rs}(y, J(s_0))$. Therefore, in the high SNR regime where the hypothesis of Lemma 1 is satisfied, the pruning of the conventional PTP-SD technique will be effective only for the lattice points in $B^c_{Rs}(y)$, the complement of $B_{Rs}(y, d_0)$. However, since these lattice points are rarely visited or they are pruned in the early layers of the search, the complexity of the conventional PTP-SD technique becomes close to that of the SD technique.

Radius Control Strategies

In selecting the initial sphere radius, two strategies exist:
1) dynamic radius update using an arbitrarily large initial radius
2) noise statistics based radius selection The dynamic radius update technique uses an arbitrarily large initial radius ($d_0 = \infty$) to prevent the search failure. Typically, a Schnorr-Euchner (SE) enumeration technique is used where the candidates for each layer are sorted based on their branch metric values. Since the search starts from the candidate layer minimizing the branch metric, SE enumeration finds the right path earlier than the scheme exploiting the lexicographic order (e.g., Pohst enumeration). The initial lattice point $Rs_b$, found by the SE enumeration, and corresponding cost $J(s_b) = \|y - Rs_b\|^2$ are called the Babai point and Babai distance, respectively. In one aspect, the SE enumeration is that the Babai point can be a loose initial point. That is, when $J(s_b) >> J(s_{ML})$, many lattice points may be located between two candidates and thus the number of lattice points visited may be considerable.

In another example, the complementing strategy of the dynamic radius control is a lattice-independent radius selection scheme proposed by Hassibi and Vikalo referred to as increase radius search (IRS). The assumption is that when the detection is done perfectly, branch metrics would contain noise contributions only. Although it is an ideal scenario, this technique provides a clue for the choice of the initial radius square $d_0$. With this assumption, $$\|y - R_{S_b}\|^2 = \sum_{i=1}^{n} v_i^2$$

becomes a chi-squared ($\chi^2$) random variable with n degrees of freedom (DOF). Thus, by denoting $$\Phi_n = \sum_{i=1}^{n} v_i^2$$

and setting a threshold probability $P_{th}$ (e.g., $P_{th} = 0.01$), a condition for the initial radius is obtained as $F_\Phi(d_0; n) = 1 - P_{th}$. Taking the inverse of a chi-squared ($\chi^2$) cumulative distribution function (CDF), we directly obtain $d_0 = F^{-1}_\Phi(1 - P_{th}; n)$. Due to the fact that the radius is chosen by the noise statistics only, a resulting advantage is the skipping of many unnecessary lattice points in the initial search. As seen from the high SNR curve in FIG. 4, only a small number of lattice points is included in the hypersphere by the proper choice of $P_{th}$. However, if the lattice points are densely packed, this approach is not effective (e.g., low SNR scenario). In addition, when the initial sphere radius square is chosen to be smaller than the ML distance ($d_0<J(s_{ML})$), the sphere search fails. In this case, $d_0$ is re-computed with smaller $P_{th}$ and the search is restarted so that an additional loop is needed for the implementation.

Inter-Search Radius Control (ISRC)

In one aspect, the dynamic radius update and the noise statistics based radius selection may be combined in a way to take advantage of both a) radius tightening by the dynamic radius update and b) probabilistic pruning by increase radius search (IRS). The present disclosure discloses two techniques, ISRC-I and ISRC-II that take advantage of the combination.

ISRC-I

One key feature of the ISRC-I search is expediting the radius search by choosing a smaller sphere radius than the radius of the cost function of the found lattice point. In a normal SD operation, a detection error occurs when the last candidate $s_f$ which corresponds to $s_{ML}$ is not equal to the transmitted symbol vector $s_{tx}$.

$$P_{err}(ML) = P(s_{ML} \neq S_{tx}) \quad (17)$$
$$= P(J(s_{ML}) < J(s_{tx}))$$
$$= P(j(s_{ML}) < \|v\|^2)$$

However, if an aggressive radius control is introduced, the search may finish without reaching the ML point. In this case, the detection error probability is:

$$P_{err}(Near-ML) = P_{err}(s_f = s_{ML}) + P_{err}(s_f \neq s_{ML}) \quad (18)$$
$$= P(s_f \neq s_{tx}, s_f = s_{ML}) +$$
$$P(s_f \neq s_{tx}, s_f \neq s_{ML})$$

The first term in the right side of equation (18) equals $P_{err}$(ML). The second term which causes an additional increase in the error probability can be further expressed as:

$$P(s_f \neq s_{tx}, s_f \neq s_{ML}) = P(J(s_{ML}) < J(s_f) < \|v\|^2) + P(J(s_{ML}) \leq \|v\|^2 < J(s_f)) \quad (19)$$

Since $J(s_{ML})$ and $\|v\|^2$ are equal or very close for the mid and high SNR regimes, the second term in equation (19) is a dominating factor and thus:

$$P_{err}(\text{Near-}ML) - P_{err}(ML) \approx P(J(s_{ML}) \leq \|v\|^2 < J(s_f)) \quad (20)$$

In the sphere search, the event $J(s_{ML}) \leq \|v\|^2 < J(s_f)$ occurs when the sphere radius square $d_0$ is set aggressively to $d_0 < J(s_{ML}) \leq \|v\|^2 < J(s_f)$. Since the goal is to achieve a sphere radius which reduces complexity while maintaining performance close to ML detection (e.g., $P_{err}$(near ML)$-P_{err}$(ML) is within $P_\delta$), then:

$$P(d_0 < J(s_{ML}) \leq \|v\|^2 < J(s_f)) \leq P_\delta \quad (21)$$

It is highly likely that $J(s_{ML}) = \|v\|^2$ for the mid and high SNR regimes, and thus:

$$F_\phi(J(s_f);n) - F_\phi(d_0;n) \leq P_\delta \quad (22)$$

and therefore $F^{-1}_\Phi(F_\Phi(J(s_f);n) - P_\delta;n) \leq d_0$. Hence, a natural choice of sphere radius when a lattice point s is found may be:

$$d_0 = F^{-1}_\Phi(F_\Phi(J(s);n) - P_\delta;n) \quad (23)$$

Employing equation (23), further shrinking of the search space can be achieved. In one aspect, with the lattice points packed locally in their cost function, even with small $P_\delta$, the ISRC-I approach provides a good complexity gain.

ISRC-II

In the ISRC-II approach, set the pre-defined threshold probabilities $P_{th} = \{0, 0.05, \dots\}$ and compute the corresponding radii:

$$d^{\{i\}}_{th} = F^{-1}(1 - P^{\{i\}}_{th}), i=1,2,\dots \quad (24)$$

Since $P_{th}$ is an increasing sequence, $d_{th}$ becomes a decreasing one. Note that the first threshold probability $P_{th}^{(1)}$ is zero to ensure the infinite radius ($d_{th}^{(1)} = F^{-1}(1 - P_{th}^{(1)};n) = \infty$).

Both these pre-computed $d_{th}$ as well as the dynamically obtained radii $J(s)$ are exploited in the sphere search. Specifically, set $d_0^{(1)} = d_{th}^{(1)} = \infty$ as an initial sphere radius square. In doing so, the search failure can be prevented and the Babai point $s_b$ is found as the first candidate. Once the Babai point is found, an updated sphere radius square is chosen as a minimum between $J(s_b)$ and $d_{th}^{(2)}$; i.e., $d_0^{(2)} = \min\{J(s_b), d_{th}^{(2)}\}$. If the distance to the Babai point is too large then the pre-defined radius $d_{th}^{(2)}$ is chosen and vice versa. In general, for the (k−1)th candidate lattice point $s_{k-1}$, the updated sphere radius square is $d_0^{(k)} = \min\{J(s_{k-1}), d_{th}^{(k)}\}$. This search a update operation is repeated until the search fails and the last lattice point found becomes the output of the algorithm. In extreme cases, the sphere radii selected may be either the cost functions of lattice points, except the first one $\{\infty, J(s_1), J(s_2), \dots\}$ where $s_1 = s_b$ and $J(s_i) < J(s_j)$ for $i > j$, or the pre-specified radii only $\{d_{th}^{(1)}, d_{th}^{(2)}, \dots d_{th}^{(n)}\}$. Since the output in the formal case is the ML solution while that of the latter case may not be, it would be judicious to design a difference between adjacent radii $|d_{th}^{(i)} - d_{th}^{(i+1)}|$ to be small after a few steps.

Choice of $P_\delta$ and $P_{th}$

In one example, to achieve near ML performance and complexity savings, $P_\delta$ of the ISRC-I approach should be carefully chosen. Generally, too large $P_\delta$ results in performance loss and too small $P_\delta$ is not helpful in reducing the complexity. From equation (23), it is clear that $F_\Phi(J(s);n) - P_\delta > 0$ and thus:

$$P_\delta = \epsilon F_\phi(J(s_f);n) \quad (25)$$

where $0 < \epsilon < 1$. In one example, use relatively large $\epsilon$ (e.g., $\epsilon \approx 0.5$) for a few initial candidates and small $\epsilon$ (e.g., $\epsilon \approx 0.1$) for the rest of the candidates. In another example, the $P_{th}$ of the ISRC-II approach is chosen in a similar way. By choosing a radius difference radii $|d_{th}^{(i)} - d_{th}^{(i+1)}|$ relatively large for the initial i, it expedites the search speed. And, after a few steps, assign a small value for minimizing the performance loss ($|d_{th}^{\{i\}} - d_{th}^{\{i+1\}}| \leq \epsilon$). One possible implementation choice is:

$$P_{th}^{\{i+1\}} = P_{th}^{\{i\}} + 0.01 \max(5-i, 1) \quad (26)$$

and the corresponding $P_{th}$ given $P_{th}^{(0)} = 0$ becomes $P_{th} = \{0, 0.05, 0.09, 0.12, 0.14, \dots\}$.

Thus, the disclosed ISRC approaches include the following features:

1) With the addition of the probabilistic radius control on top of the dynamic adjustment, tight sphere radius minimizing performance loss is obtained. While the probabilistic control is added on top of the dynamic control in the ISRC-I approach, statistically computed ($d_{th}$) and dynamically adjusted radius square ($J(s)$) are competing in the ISRC-II approach.

2) Features of the ISRC approach and the intra search radius control approach (e.g., PTP-SD) can be effectively combined. In one aspect, the ISRC approach is especially useful when the lattice points are spaced apart (e.g., high SNR) and the intra search radius control approach is more effective for the densely packed lattice structure (e.g., low SNR).

3) The extra complexity of the intra search radius control approach is at most one subtraction per layer, and for the ISRC approach, it is one compare operation when a candidate lattice point is found. Since the online computation of a chi-squared CDF and inverse CDF is a bit cumbersome, in one example, a lookup table is an option for computing $d_0$ in the ISRC-I approach. In another example, an offline tabulation is enough for the ISRC-II approach.

An example of a combination of the ISRC and the PTP-SD approach is summarized in Table I. For example, the PTP-SD and the ISRC are implemented by modifying the step 5 and 6 of the SD algorithm, respectively.

TABLE 1

ISRC ALGORITHM

| | |
|---|---|
| Input: | y', R, $d_o=\infty$, $\beta_0, ..., \beta_{m-1}$, $P_\delta$ (ISRC-I), $\{d_{th}^{\{i\}}; i = 1,2,...\}$ (ISRC-II) |
| Output: | $\hat{s}$ |
| Variable: | k denotes the (m−k+1)-th layer being examined |
| | v denotes the count for the candidate lattice point found |
| | $i_k$ denotes the lattice point index sorted by the SE enumeration in the (m−k+1)-th layer |
| Step 1: | Set k=m, $\tilde{d}_0$ (m)=$d_0-\beta_{m-1}$, $P_{m+1}{}^m = 0$, v=1. |
| Step 2: | Compute $s_{k,max}$ and $s_{k,min}$ satisfying (6) with $d_0$ replaced by $\tilde{d}_0(k)$. |
| | $N_s = s_{k,max} - s_{k,min} + 1$ |
| | Compute the branch metrics $B_k(s_k{}^m) = (y_k - \Sigma_{l=k}{}^m r_{k,l} s_l)^2$ for every $s_k$ |
| | $\in [s_{k,min}, s_{k,max}]$. |
| | Obtain the sorted $s_{k,i_k}$ by the SE enumeration. |
| | Set $i_k=0$. |
| Step 3: | $i_k=i_k+1$. |
| | If $i_k > N_s$, go to step 4. |
| | Else goto step 5. |
| Step 4: | k=k+1. |
| | If k=m+1, output the latest s and terminate. |
| | Else go to step 3. |
| Step 5: | Update the path metric $P_k{}^m(s_k{}^m) = P_{k+1}{}^m(s_{k+1}{}^m) + B_k(s_k{}^m)$ (PTP-SD). |
| | If k=1, go to step 6. |
| | Else k=k−1, $\tilde{d}_0$ (k)= $d_0 - \beta_{k-1}$ go to step 2. |
| Step 6: | If $P_1 < d_0$, save s, v=v+1, and update |
| | (if ISRC-I) $d_0 = F_\Phi^{-1}(F_\Phi(P_1{}^m);n) - P_\delta;n)$ |
| | (if ISRC-II) $d_0 = \min\{P_1{}^m, d_{th}{}^{\{v\}}\}$ |
| | Go to step 4. |

Figure 6A:
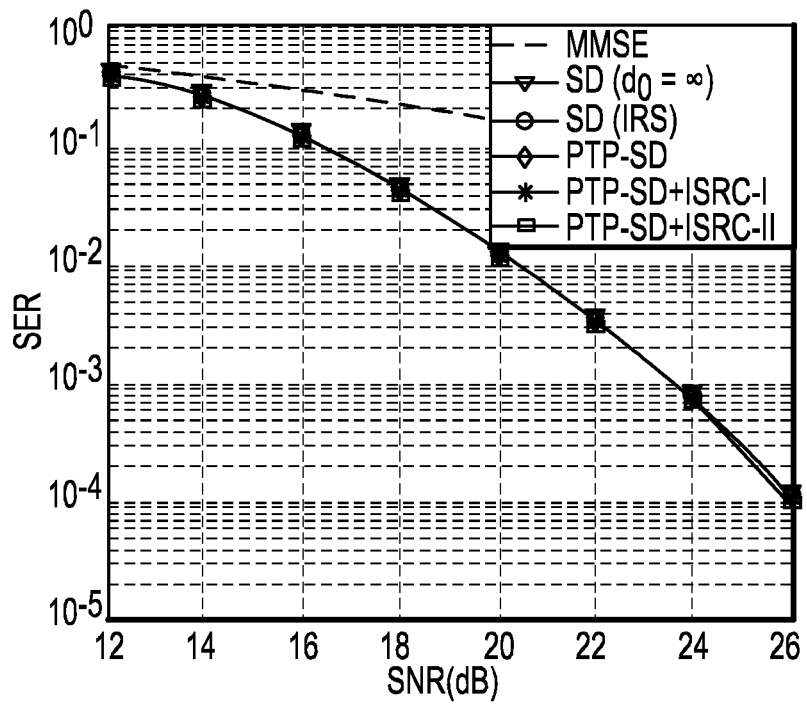
FIGS. 6a and 6b illustrate examples of performances and complexity of sphere decoding (SD) algorithm for a 4×4 MIMO system with 16-QAM modulation illustrating symbol error rate (SER) and complexity, respectively.
Figure 6B:
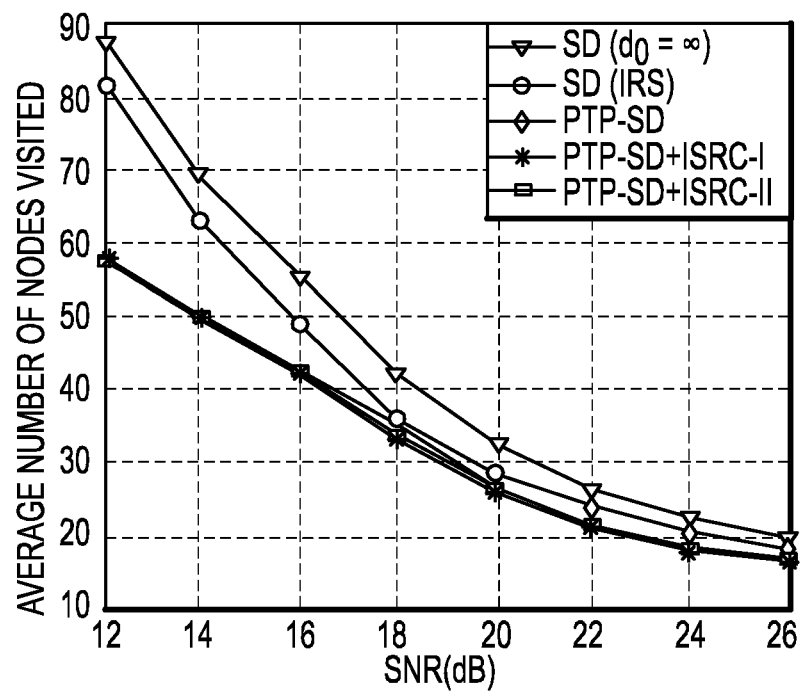

FIGS. 6a and 6b illustrate examples of performance and complexity of sphere decoding (SD) algorithm for a 4×4 MIMO system with 16-QAM modulation illustrating symbol error rate (SER) and complexity, respectively. The performance results for the 4×4 MIMO systems with 16-QAM modulation is shown in FIG. 6a. While the performance difference is unnoticeable among the references SD, PTP-SD, and ISRC approaches over the simulation range, the clear distinction in complexity is evident as shown in FIG. 6b. Although the PTP-SD technique achieves considerable complexity reduction in the low SNR regime, its benefit decreases as the SNR increases.

In one aspect, the IRS-based SD approach shows relatively large reduction in complexity in the high SNR regime. The disclosed ISRC-I and ISRC-II approaches adopt the advantages of two other approaches to form a combination of (ISRC, PTP and SD), resulting in a reduced complexity. In fact, the complexity reduction in the low SNR regime derives mostly from the PTP-SD approach and the complexity reduction in the high SNR regime derives mainly from the ISRC approach.

Figure 7A:
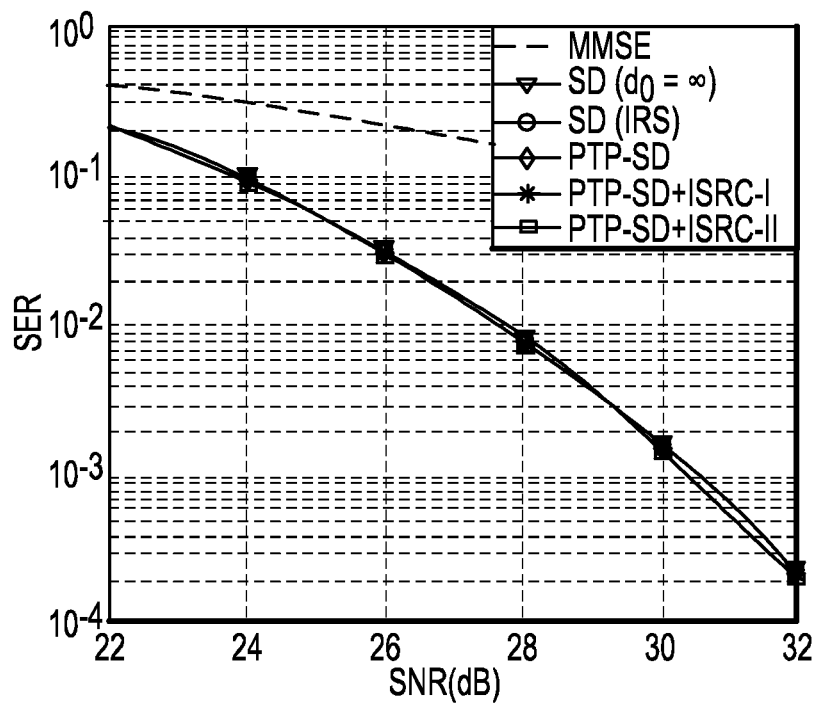
FIGS. 7a and 7b illustrate examples of performance and complexity of sphere decoding (SD) algorithm for a 4×4 MIMO system with 64-QAM modulation illustrating symbol error rate (SER) and complexity, respectively.
Figure 7B:
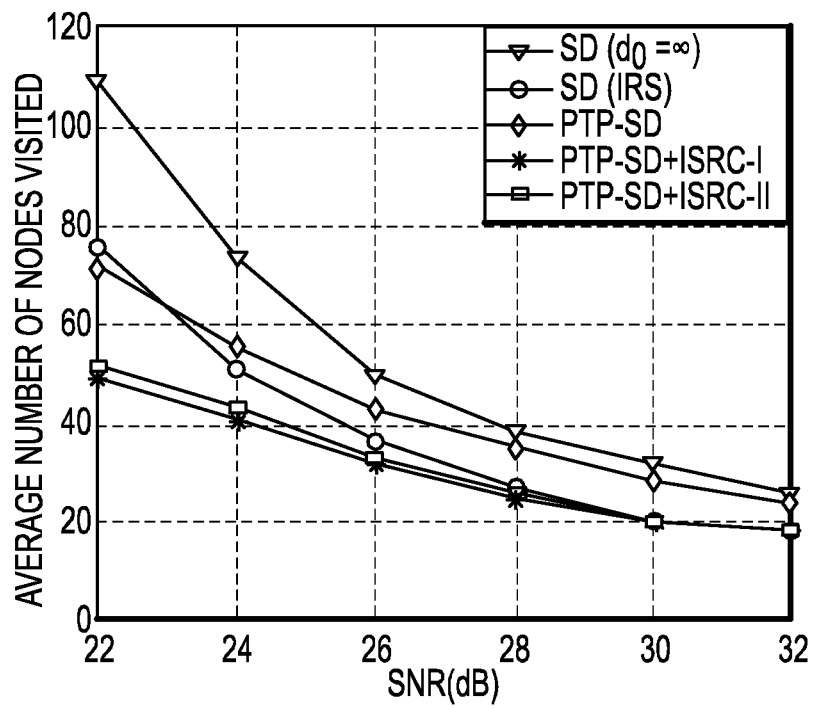

FIGS. 7a and 7b illustrate examples of performance and complexity of sphere decoding (SD) algorithm for a 4×4 MIMO system with 64-QAM modulation illustrating symbol error rate (SER) and complexity, respectively. As shown in FIG. 7a, the performance gain of the SD approach over the MMSE approach becomes notably better than that of the 16-QAM scenario while the difference among the various SD approach is still negligible. Since the width of tree becomes larger and the depth is fixed, as shown in FIG. 7b, the tree pruning effect of the PTP-SD approach becomes smaller and the IRS-based SD approach shows a relatively better complexity result. Since the sphere reduction of ISRC is effective, the disclosed ISRC-I and ISRC-II approaches show the best results providing considerable gain over the IRS-based SD techniques in low and mid SNR regimes.

Figure 8A:
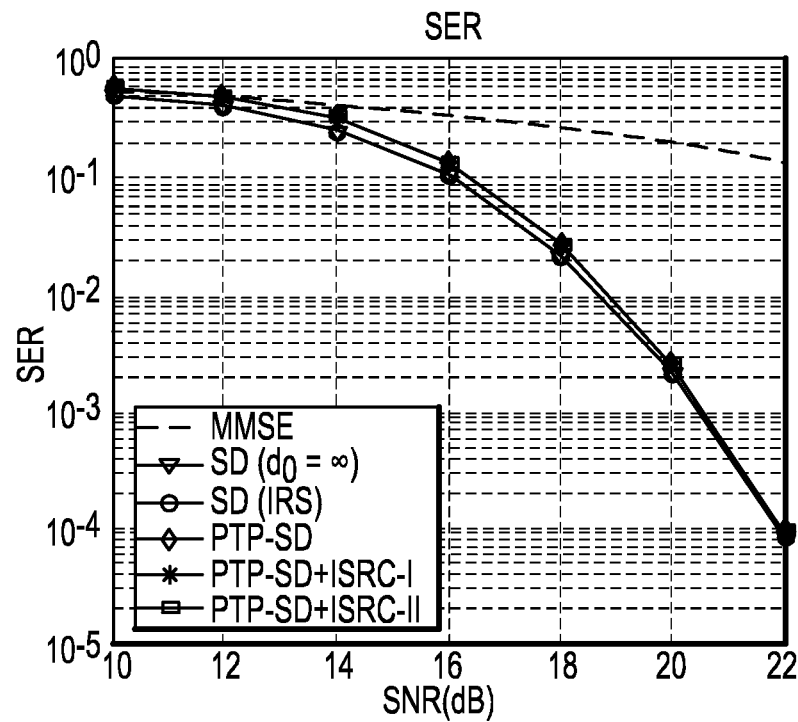
FIGS. 8a and 8b illustrate examples of performance and complexity of sphere decoding (SD) algorithm for a 8×8 MIMO system with 16-QAM modulation illustrating symbol error rate (SER) and complexity, respectively.
Figure 8B:
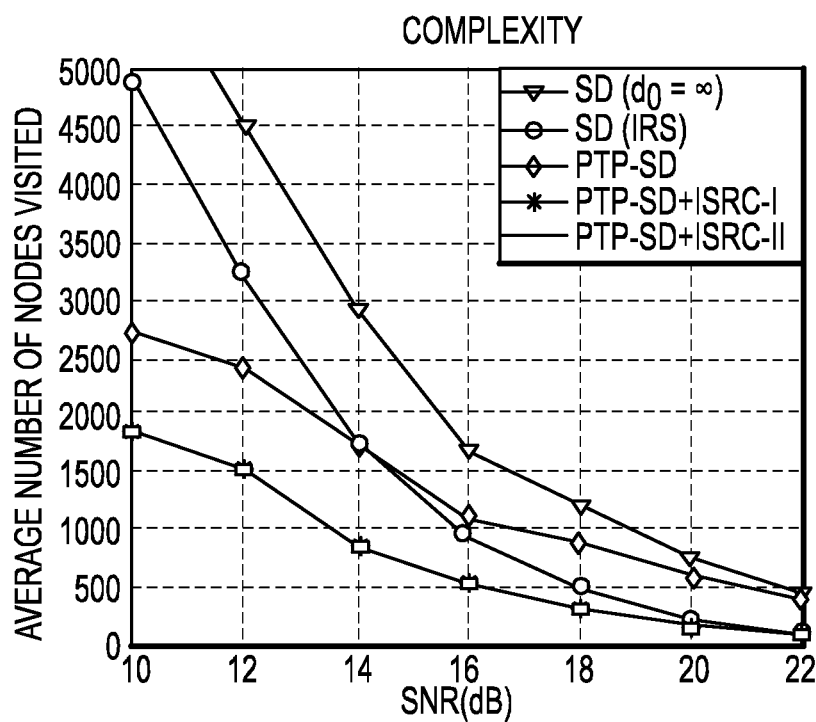

FIGS. 8a and 8b illustrate examples of performance and complexity of sphere decoding (SD) algorithm for a 8×8 MIMO system with 16-QAM modulation illustrating symbol error rate (SER) and complexity, respectively. In one example, as the size of the matrix increases, a worst case complexity (a total of $16^8 \approx 4.3 \times 10^9$ lattice points) becomes much higher than a 4×4 case (65536 for 16-QAM lattice points and $1.7 \times 10^7$ for 64-QAM lattice points, respectively). As shown in FIG. 8a, the performance gain of the SD over the MMSE becomes noticeably better than the 4×4 scenario resulting in almost 8 dB gain at SER=0.1. In the FIG. 8a example, the performance degradation of the disclosed ISRC-I and ISRC-II approaches over the SD technique is still negligible so that the worst case loss is around 0.3 dB. The complexity curves in FIG. 8b show similar but clearer distinction between PTP-SD and IRS-based SD approaches so that the PTP-SD approach performs better in the left side (low SNR regime) of the crossover point (around 14 dB) and the IRS-based SD approach performs better in the right side (high SNR regime). The disclosed ISRC-I and ISRC-II approaches achieve the minimal computational complexity among all the other approaches under test, for example, providing a 3 times reduction in complexity over the reference SD approach. Even compared to the PTP-SD approach, the disclosed ISRC-I and ISRC-II approaches achieve at least 30% complexity reduction in the entire simulation range, in one example.

One skilled in the art would understand that the simulation results disclosed herein are examples based on specific parameters and that other simulation results are possible, whether using similar or different parameters, without affecting the spirit or scope of the present disclosure.

In the disclosed ISRC-I and ISRC-II approaches, a radius control strategy for sphere decoding referred to as inter-search radius control (ISRC) algorithm is proposed that provides further complexity reduction with minimal performance loss. Unlike the conventional PTP-SD approach that provides per-layer radius control by the probabilistic noise constraint, the disclosed ISRC-I and ISRC-II approaches focus on the radius control when the candidate lattice point is found. Thus, a hybrid of the dynamic radius update and the noise statistics-based radius control is employed. From simulations results over MIMO channels, the combination of the ISRC and the PTP-SD approaches provide further complexity reduction, in particular for high SNR regimes, at the expense of negligible performance loss. Since the additional implementation overhead is negligible (e.g., one compare operation when the candidate lattice point is found), the disclosed ISRC-I and ISRC-II approaches can be integrated to SD applications such as sphere encoding for multi-user MIMO systems or list sphere decoding with minimal code modifications.

Figure 9:
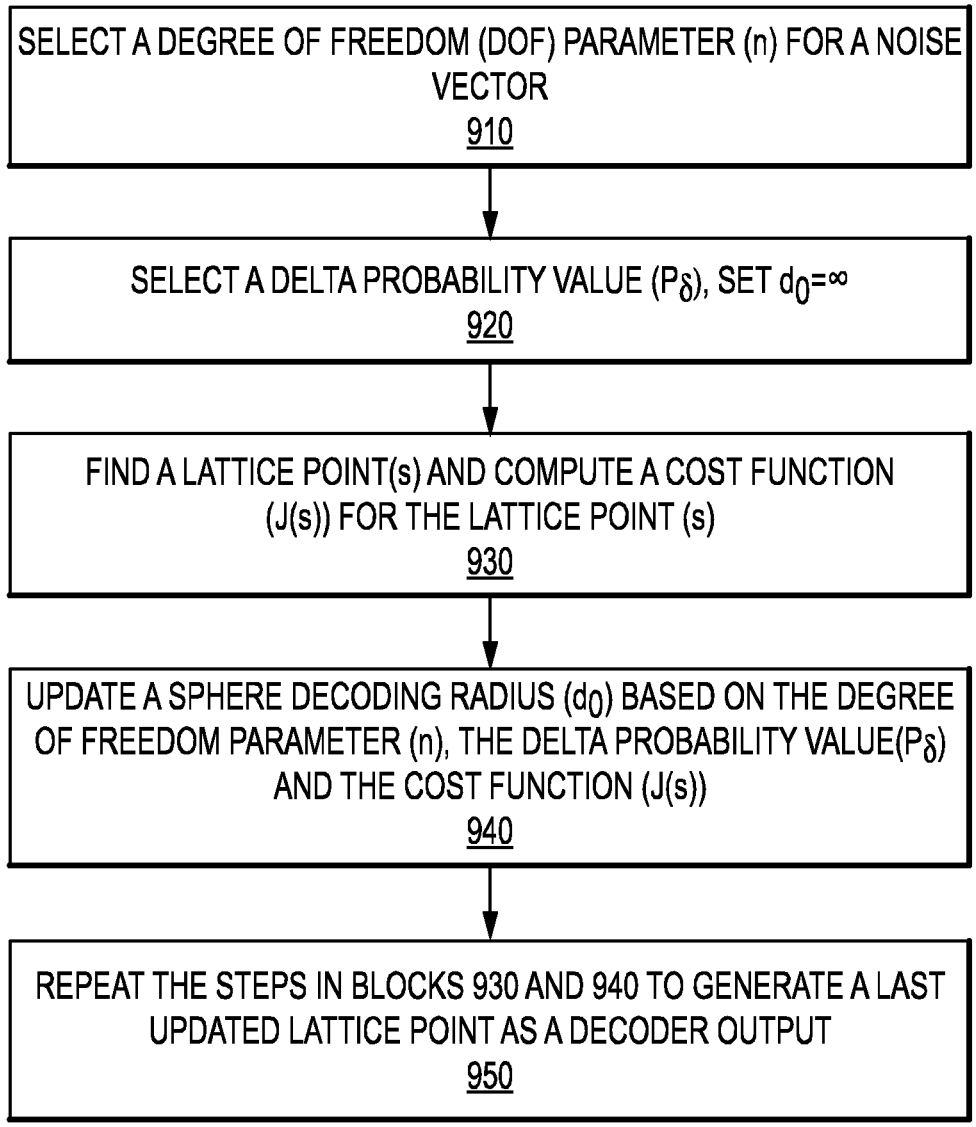
FIG. 9 illustrates a first example of a flow diagram for symbol decoding using tree pruning based sphere search.

FIG. 9 illustrates a first example of a flow diagram for symbol decoding using tree pruning based sphere search. In block 910, select a degree of freedom (DOF) parameter (n) for a noise vector. In one aspect, the noise vector is an independent identically distributed (IID) Gaussian noise vector (v). Following block 910, in block 920, select a delta probability value ($P_\delta$). In one aspect, also set $d_0=\infty$. In one aspect, the delta probability value is selected such that the difference in error probability values for a near-ML detection and a ML detection is less than the delta probability value. Following block 920, in block 930, find a lattice point (s) and compute a cost function (J(s)) for the lattice point (s). In one aspect, the lattice point is one of a discrete set of nominal codeword positions in a hypersphere. Following block 930, in block 940, update a sphere decoding radius ($d_0$) based on the degree of freedom parameter (n), the delta probability value ($P_\delta$) and the cost function (J(s)). In one aspect, the selection of the sphere decoding radius ($d_0$) is performed in accordance with the following equation: $d_0 = F^{-1}_{\chi^2}(F_{\chi^2}(J(s); n) - P_\delta; n)$ where $F_{\chi^2}$ is the cumulative distribution function (CDF) of a chi-square ($\chi^2$) random variable with a degree of freedom (DOF) parameter (n), and where $F^{-1}_{\chi^2}$ is the inverse CDF of a chi-squared ($\chi^2$) random variable with a degree of freedom (DOF) parameter (n). Following block 940, in block 950, decode a symbol using the sphere decoding radius ($d_0$). In one aspect, repeat the steps in blocks 930 and 940 to generate a last updated lattice point as a decoder output. In one aspect, the decoding step is performed by either the symbol demod B 230 or the Rx Data Processor B 250 illustrated in FIG. 1. In another aspect, the symbol demod B 230 work in conjunction with the Rx Data Processor B 250 to perform the decoding step of block 950.

Figure 10:
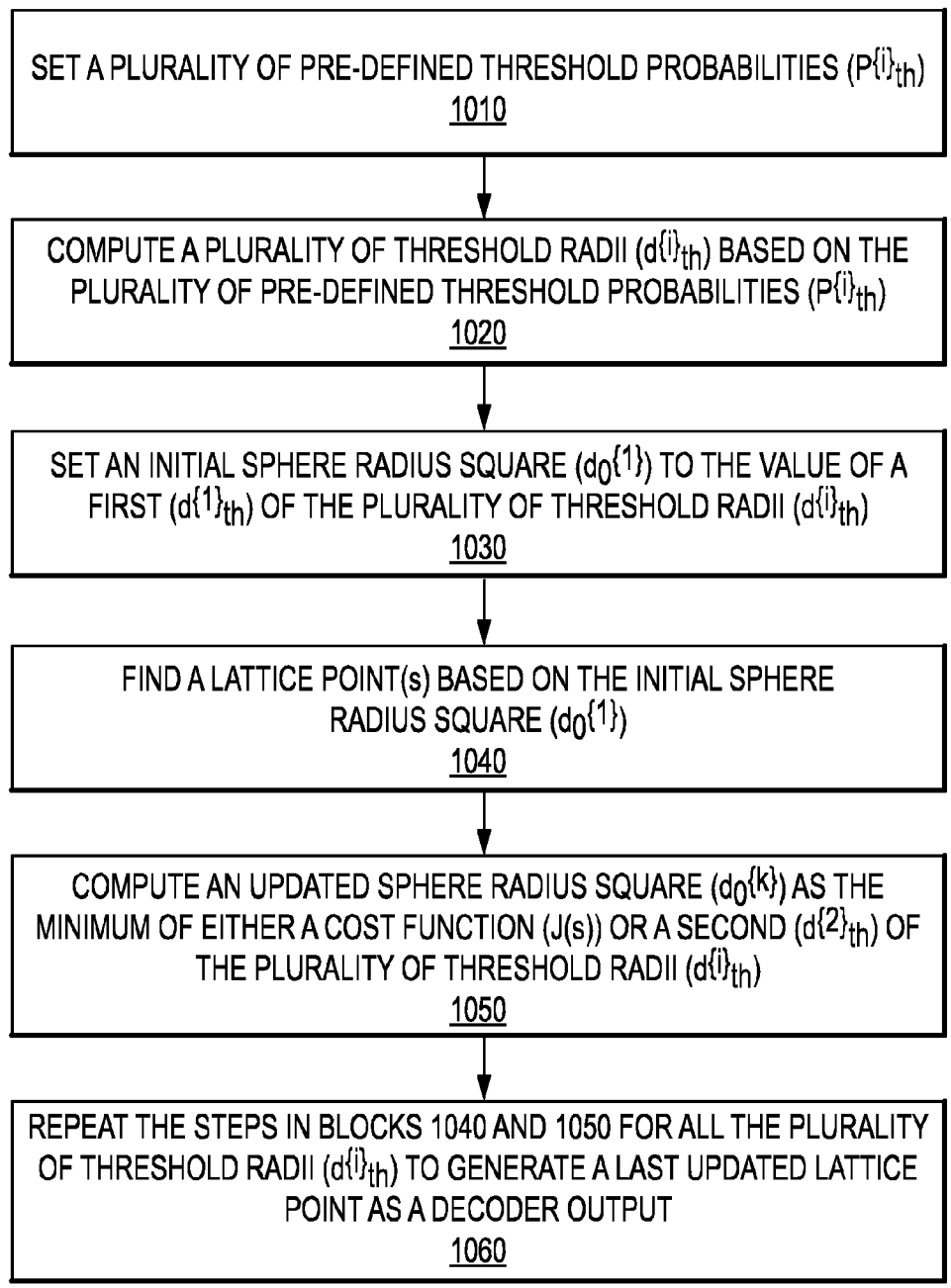
FIG. 10 illustrates a second example of a flow diagram for symbol decoding using tree pruning based sphere search.

FIG. 10 illustrates a second example of a flow diagram for symbol decoding using tree pruning based sphere search. In block 1010, set a plurality of pre-defined threshold probabilities ($P^{\{i\}}_{th}$). In one example, i is an integer from 1, 2, ... etc. Following block 1010, in block 1020, compute a plurality of threshold radii ($d^{\{i\}}_{th}$) based on the plurality of pre-defined threshold probabilities ($P^{\{i\}}_{th}$). In one example, each of the plurality of threshold radii ($d^{\{i\}}_{th}$) corresponds to one of the plurality of pre-defined threshold probabilities ($P^{\{i\}}_{th}$). In one example, the plurality of threshold radii ($d^{\{i\}}_{th}$) is computed based on the following equation: $d^{\{i\}}_{th} = F^{-1}(1 - P^{\{i\}}_{th})$ where i is an integer starting at 1, 2, ... etc. and $F^{-1}$ is an inverse cumulative distribution function (CDF) of a chi-square ($\chi^2$) random variable with a degree of freedom (DOF) parameter (n). Following block 1020, in block 1030, set an initial sphere radius square ($d_0^{\{1\}}$) to the value of a first ($d^{\{1\}}_{th}$) of the plurality of threshold radii ($d^{\{i\}}_{th}$). In one aspect, the first ($d^{\{1\}}_{th}$) of the plurality of threshold radii ($d^{\{i\}}_{th}$) is infinity.

Following block 1030, in block 1040, find a lattice point (s) based on the initial sphere radius square ($d_0^{\{1\}}$). Following block 1040, in block 1050, compute an updated sphere radius square ($d_0^{\{k\}}$) as the minimum of either a cost function (J(s)) or a second ($d^{\{2\}}_{th}$) of the plurality of threshold radii ($d^{\{i\}}_{th}$). In one example, the cost function (J($s_b$)) is associated with the Babai point ($s_b$). Following block 1050, find a lattice point ($s_k$) based on the updated sphere radius square ($d_0^{\{k\}}$). In one aspect, finding a lattice point means a new lattice point is better than the last found lattice point in the cost function J(s). In one aspect, following block 1050, in block 1060, repeat the steps in blocks 1040 and 1050 for all the plurality of threshold radii ($d^{\{i\}}_{th}$) to generate the last lattice point as a decoder output.

One skilled in the art would understand that the steps disclosed in the example flow diagrams in FIGS. 9 and 10 can be interchanged in their order without departing from the scope and spirit of the present disclosure. Also, one skilled in the art would understand that the steps illustrated in the flow diagrams are not exclusive and other steps may be included or one or more of the steps in the example flow diagrams may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 11:
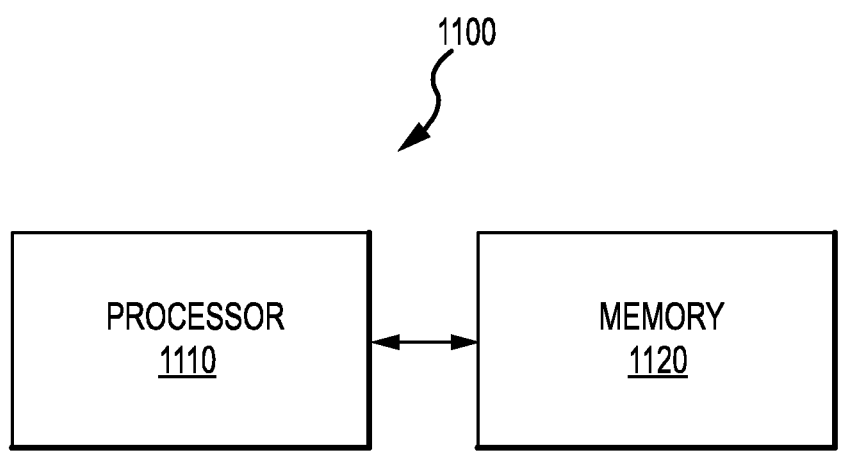
FIG. 11 illustrates an example of a device comprising a processor in communication with a memory for executing the processes for symbol decoding using tree pruning based sphere search.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for executing the processes for symbol decoding using tree pruning based sphere search. In one example, the device 400 is used to implement the algorithm illustrated in FIGS. 9 and 10. In one aspect, the memory 420 is located within the processor 410. In another aspect, the memory 420 is external to the processor 410. In one aspect, the processor includes circuitry for implementing or performing the various flow diagrams, logical blocks and/or modules described herein.

Figure 12:
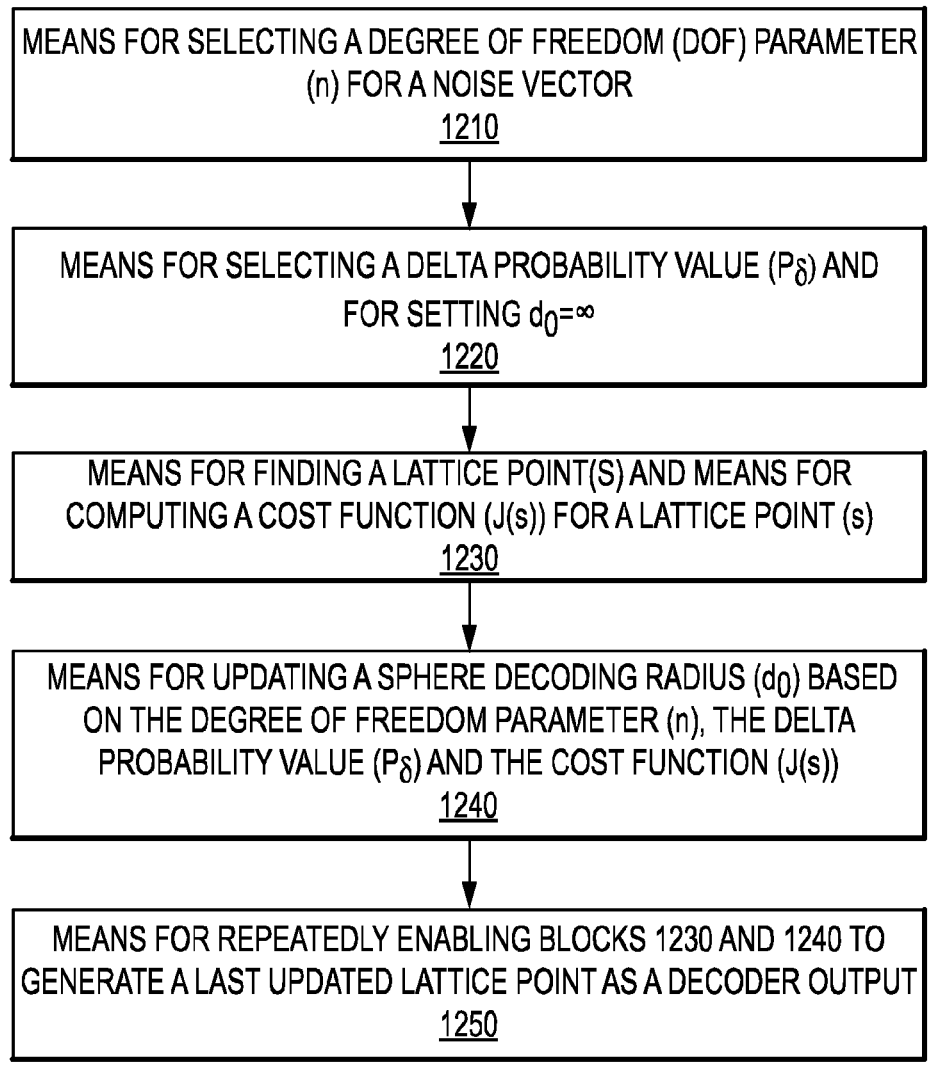
FIG. 12 illustrates a first example of a device suitable for symbol decoding using tree pruning based sphere search.

FIG. 12 illustrates a first example of a device 1200 suitable for symbol decoding using tree pruning based sphere search. In one aspect, the device 1200 is implemented by at least one processor comprising one or more modules configured to provide different aspects of symbol decoding using tree pruning based sphere search as described herein in blocks 1210, 1220, 1230, 1240 and 1250. For example, each module comprises hardware, firmware, software, or any combination thereof. In one aspect, the device 1200 is also implemented by at least one memory in communication with the at least one processor.

Figure 13:
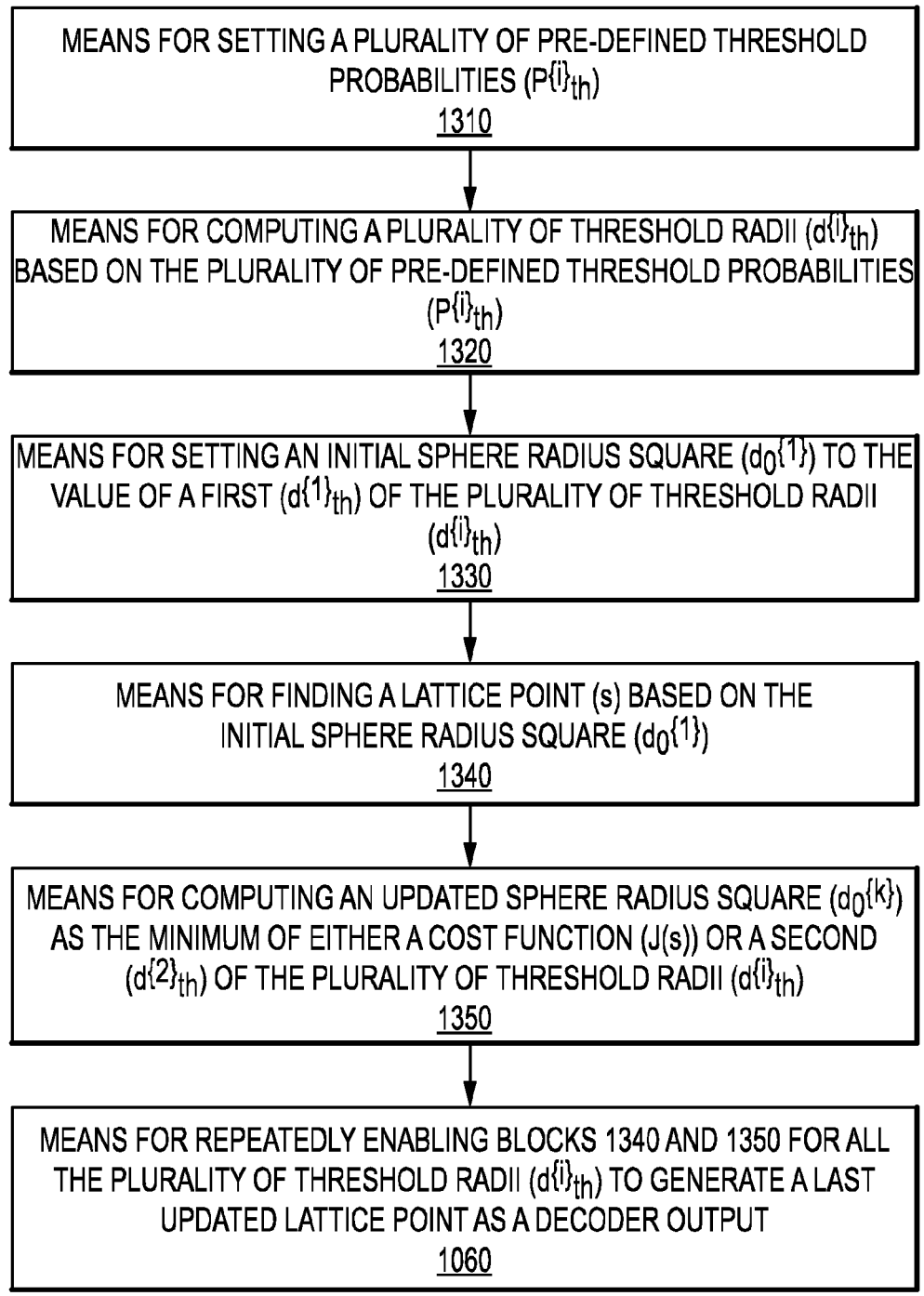
FIG. 13 illustrates a second example of a device suitable for symbol decoding using tree pruning based sphere search.

FIG. 13 illustrates a second example of a device 1300 suitable for symbol decoding using tree pruning based sphere search. In one aspect, the device 1300 is implemented by at least one processor comprising one or more modules configured to provide different aspects of symbol decoding using tree pruning based sphere search as described herein in blocks 1310, 1320, 1330, 1340, 1350 and 1360. For example, each module comprises hardware, firmware, software, or any combination thereof. In one aspect, the device 1300 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for symbol decoding using tree pruning based sphere search comprising:
    selecting a degree of freedom (DOF) parameter for a noise vector;
    selecting a delta probability value;
    computing a cost function for a lattice point wherein the lattice point is one of a discrete set of nominal codeword positions in a hypersphere;
    updating a sphere decoding radius based on the degree of freedom parameter, the delta probability value and the cost function; and
    decoding a symbol using the updated sphere decoding radius.

2. The method of claim 1 wherein the noise vector is an independent identically distributed (IID) Gaussian noise vector.

3. The method of claim 1 wherein the delta probability value is selected such that the difference in error probability values for a near-ML detection and a ML detection is less than the delta probability value.

4. The method of claim 1 wherein updating the sphere decoding radius uses the following equation:

$$d_0 = F^{-1}{}_\Phi(F_\Phi(J(s);n) - P_\delta;n)$$

where $d_0$ is the sphere decoding radius,
$F_\Phi$ is the cumulative distribution function (CDF) of a chi-square ($\chi^2$) random variable with the degree of freedom (DOF) parameter, and
$F^{-1}{}_\Phi$ is the inverse CDF of the chi-squared ($\chi^2$) random variable with the degree of freedom (DOF) parameter.

5. An apparatus for symbol decoding using tree pruning based sphere search, the apparatus comprising a processor and a memory, the memory containing program code executable by the processor for performing the following:
    selecting a degree of freedom (DOF) parameter for a noise vector;
    selecting a delta probability value;
    computing a cost function for a lattice point wherein the lattice point is one of a discrete set of nominal codeword positions in a hypersphere;
    updating a sphere decoding radius based on the degree of freedom parameter, the delta probability value and the cost function; and
    decoding a symbol using the updated sphere decoding radius.

6. The apparatus of claim 5 wherein the noise vector is an independent identically distributed (IID) Gaussian noise vector.

7. The apparatus of claim 5 wherein the delta probability value is selected such that the difference in error probability values for a near-ML detection and a ML detection is less than the delta probability value.

8. The apparatus of claim 5 wherein the memory further comprising a program code for updating sphere decoding radius uses the following equation:

$$d_0 = F^{-1}{}_\Phi(F_\Phi(J(s);n) - P_\delta;n)$$

where $d_0$ is the sphere decoding radius,
$F_\Phi$ is the cumulative distribution function (CDF) of a chi-square ($\chi^2$) random variable with the degree of freedom (DOF) parameter, and
$F^{-1}{}_\Phi$ is the inverse CDF of the chi-squared ($\chi^2$) random variable with the degree of freedom (DOF) parameter.

9. An apparatus for symbol decoding using tree pruning based sphere search, the apparatus comprising a processor and a memory, the memory containing program code executable by the processor to provide:
    means for selecting a degree of freedom (DOF) parameter for a noise vector;
    means for selecting a delta probability value;
    means for computing a cost function for a lattice point wherein the lattice point is one of a discrete set of nominal codeword positions in a hypersphere;
    means for updating a sphere decoding radius based on the degree of freedom parameter, the delta probability value and the cost function; and
    means for decoding a symbol using the updated sphere decoding radius.

10. The apparatus of claim 9 wherein the noise vector is an independent identically distributed (IID) Gaussian noise vector.

11. The apparatus of claim 9 wherein the delta probability value is selected such that the difference in error probability values for a near-ML detection and a ML detection is less than the delta probability value.

12. The apparatus of claim 9 wherein the means for updating the sphere decoding radius uses the following equation:

$$d_0 = F^{-1}_\Phi(F_\Phi(J(s);n) - P_\delta;n)$$

where $d_0$ is the sphere decoding radius, $F_\Phi$ is the cumulative distribution function (CDF) of a chi-square ($\chi^2$) random variable with the degree of freedom (DOF) parameter, and $F^{-1}_\Phi$ is the inverse CDF of the chi-squared ($\chi^2$) random variable with the degree of freedom (DOF) parameter.

13. A non-transitory computer-readable medium storing a computer program, said computer program executing steps comprising:

selecting a degree of freedom (DOF) parameter for a noise vector;

selecting a delta probability value;

computing a cost function for a lattice point wherein the lattice point is one of a discrete set of nominal codeword positions in a hypersphere;

updating a sphere decoding radius based on the degree of freedom parameter, the delta probability value and the cost function; and decoding a symbol using the updated sphere decoding radius.

14. The non-transitory computer-readable medium of claim 13 wherein the computer program for executing updating the sphere decoding radius uses the following equation:

$$d_0 = F^{-1}_\Phi(F_\Phi(J(s);n) - P_\delta;n)$$

where $d_0$ is the sphere decoding radius, $F_\Phi$ is the cumulative distribution function (CDF) of a chi-square ($\chi^2$) random variable with the degree of freedom (DOF) parameter, and $F^{-1}_\Phi$ is the inverse CDF of the chi-squared ($\chi^2$) random variable with the degree of freedom (DOF) parameter.

* * * * *